US012657739B2

(12) United States Patent
Qian et al.

(10) Patent No.: US 12,657,739 B2
(45) Date of Patent: Jun. 16, 2026

(54) FEATURE SELECTION FOR OBJECT TRACKING USING MOTION MASK, MOTION PREDICTION, OR BOTH

(71) Applicant: ObjectVideo Labs, LLC, Tysons, VA (US)

(72) Inventors: Gang Qian, McLean, VA (US); Sung Chun Lee, Fairfax, VA (US); Sravanthi Bondugula, Vienna, VA (US); Narayanan Ramanathan, Chantilly, VA (US); Allison Beach, Leesburg, VA (US)

( * ) Notice: Subject to any disclaimer, the term of this patent is extended or adjusted under 35 U.S.C. 154(b) by 646 days.

(21) Appl. No.: 17/982,133

(22) Filed: Nov. 7, 2022

(65) Prior Publication Data

US 2023/0143370 A1     May 11, 2023

Related U.S. Application Data

(60) Provisional application No. 63/277,838, filed on Nov. 10, 2021.

(51) Int. Cl.
G06T 7/246 (2017.01)
G06T 7/277 (2017.01)

(52) U.S. Cl.
CPC .............. G06T 7/248 (2017.01); G06T 7/277 (2017.01); G06T 2207/10016 (2013.01); G06T 2207/30196 (2013.01); G06T 2207/30232 (2013.01)

(58) Field of Classification Search
None
See application file for complete search history.

(56) References Cited

U.S. PATENT DOCUMENTS

| | | | | |
|---|---|---|---|---|
| 2,019,037 | A * | 10/1935 | Ayres | ..................... C10G 17/02 208/46 |
| 11,922,667 | B2 * | 3/2024 | Chae | ....................... G06T 7/215 |
| 2016/0117840 | A1 * | 4/2016 | Yamamoto | ............. G06V 40/23 382/103 |

(Continued)

FOREIGN PATENT DOCUMENTS

| | | | | |
|---|---|---|---|---|
| CN | 115698949 A | * | 2/2023 | ............... G06F 8/38 |

OTHER PUBLICATIONS

Translation for CN 115698949.*

(Continued)

*Primary Examiner* — Vikkram Bali
(74) *Attorney, Agent, or Firm* — Fish & Richardson P.C.

(57) ABSTRACT

Methods, systems, and apparatus, including computer programs encoded on computer storage media, for feature selection for object tracking. One of the methods includes: obtaining first feature points of an object in a first image of a scene captured by a camera; obtaining a second image of the scene captured by the camera after the first image was captured; determining whether a motion prediction of the object is available that indicates an area of the second image where the object is likely located; in response to determining that the motion prediction of the object is available, identifying, in the area of the second image where the object is likely located, second feature points that satisfy a similarity threshold for the first feature points in the first image; and detecting the object in the second image using the identified second feature points.

20 Claims, 4 Drawing Sheets

(56) References Cited

U.S. PATENT DOCUMENTS

| 2016/0171311 | A1* | 6/2016 | Case | G06T 7/215 |
| | | | | 382/103 |
| 2021/0304020 | A1* | 9/2021 | Kaplan | G06N 5/02 |
| 2023/0095568 | A1* | 3/2023 | Tarashima | G06T 7/277 |
| | | | | 382/103 |

OTHER PUBLICATIONS

Kalman, R. E., "A New Approach to Linear Filtering and Prediction Problems," Journal of Basic Engineering, Mar. 1960, 82(1):35-45.

* cited by examiner

200

```
┌─────────────────────────────────────────────────────────────────────────┐
│         OBTAIN A FIRST IMAGE OF A SCENE CAPTURED BY A CAMERA               │
│                                                               202          │
└─────────────────────────────────────────────────────────────────────────┘
                                    │
                                    ▼
┌─────────────────────────────────────────────────────────────────────────┐
│   IDENTIFY A BOUNDING OBJECT AROUND AN OBJECT DETECTED IN THE FIRST IMAGE  │
│                                                               204          │
└─────────────────────────────────────────────────────────────────────────┘
                                    │
                                    ▼
┌─────────────────────────────────────────────────────────────────────────┐
│              IDENTIFY AREAS OF MOTION IN THE FIRST IMAGE                   │
│                                                               206          │
└─────────────────────────────────────────────────────────────────────────┘
                                    │
                                    ▼
┌─────────────────────────────────────────────────────────────────────────┐
│  SELECT FIRST FEATURE POINTS THAT ARE WITHIN BOTH THE BOUNDING OBJECT AND THE │
│              AREAS OF MOTION IN THE FIRST IMAGE                            │
│                                                               208          │
└─────────────────────────────────────────────────────────────────────────┘
                                    │
                                    ▼
┌─────────────────────────────────────────────────────────────────────────┐
│  OBTAIN A SECOND IMAGE OF THE SCENE CAPTURED BY THE CAMERA AFTER THE FIRST │
│                     IMAGE WAS CAPTURED                                     │
│                                                               210          │
└─────────────────────────────────────────────────────────────────────────┘
                                    │
                                    ▼
┌─────────────────────────────────────────────────────────────────────────┐
│    DETECT THE OBJECT IN THE SECOND IMAGE USING THE SELECTED FEATURE POINTS │
│                                                               212          │
└─────────────────────────────────────────────────────────────────────────┘
```

FIG. 2

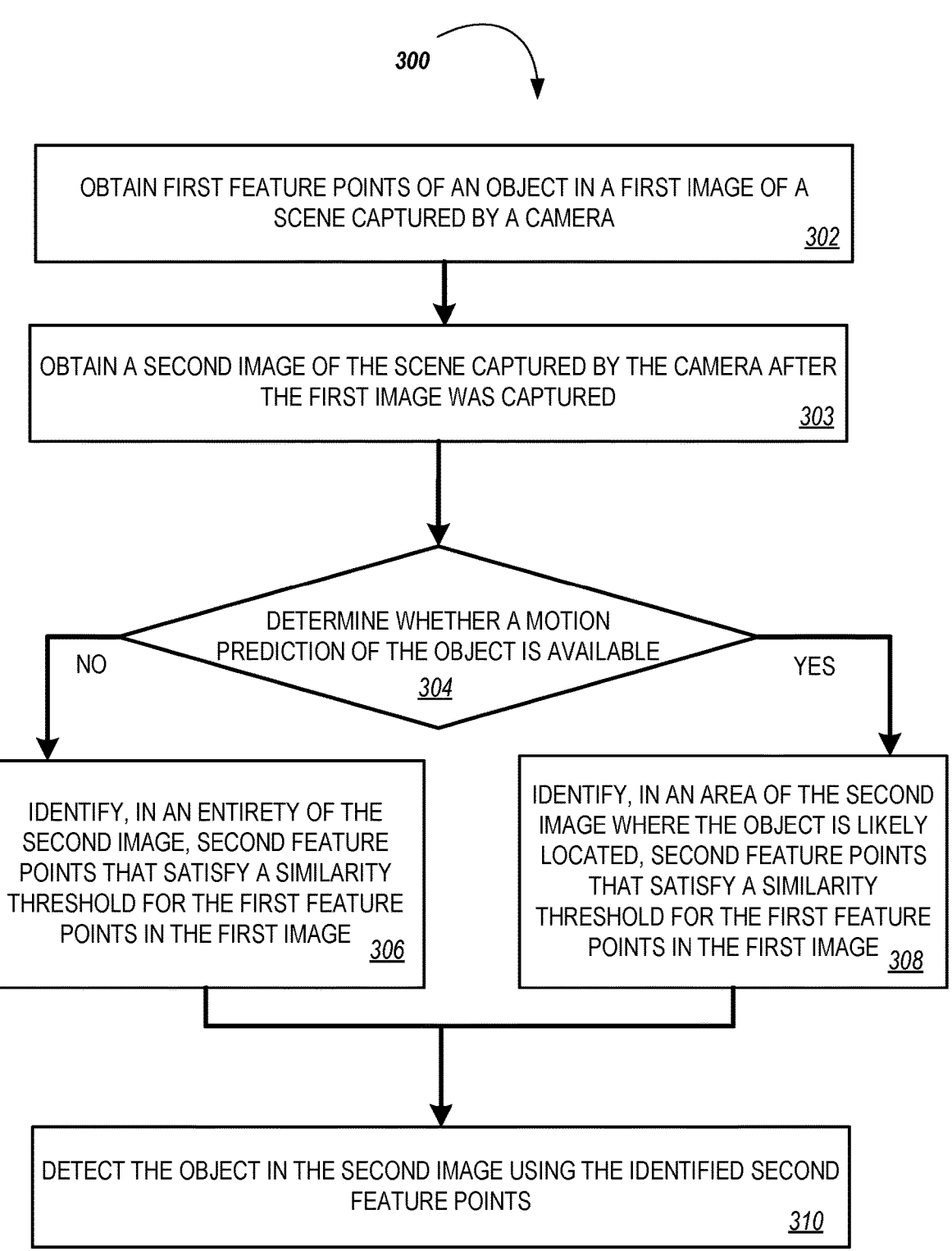

*300*

OBTAIN FIRST FEATURE POINTS OF AN OBJECT IN A FIRST IMAGE OF A SCENE CAPTURED BY A CAMERA    *302*

OBTAIN A SECOND IMAGE OF THE SCENE CAPTURED BY THE CAMERA AFTER THE FIRST IMAGE WAS CAPTURED    *303*

DETERMINE WHETHER A MOTION PREDICTION OF THE OBJECT IS AVAILABLE    *304*

NO

YES

IDENTIFY, IN AN ENTIRETY OF THE SECOND IMAGE, SECOND FEATURE POINTS THAT SATISFY A SIMILARITY THRESHOLD FOR THE FIRST FEATURE POINTS IN THE FIRST IMAGE    *306*

IDENTIFY, IN AN AREA OF THE SECOND IMAGE WHERE THE OBJECT IS LIKELY LOCATED, SECOND FEATURE POINTS THAT SATISFY A SIMILARITY THRESHOLD FOR THE FIRST FEATURE POINTS IN THE FIRST IMAGE    *308*

DETECT THE OBJECT IN THE SECOND IMAGE USING THE IDENTIFIED SECOND FEATURE POINTS    *310*

FIG. 3

FEATURE SELECTION FOR OBJECT TRACKING USING MOTION MASK, MOTION PREDICTION, OR BOTH

CROSS-REFERENCE TO RELATED APPLICATION

This application claims the benefit of U.S. Provisional Application No. 63/277,838, filed on Nov. 10, 2021, the contents of which are incorporated by reference herein.

BACKGROUND

Many properties are equipped with monitoring systems that include sensors and connected system components. Some residential-based monitoring systems include cameras.

SUMMARY

Some residents and homeowners equip their properties with monitoring systems to enhance the security, safety, or convenience of their properties. A property monitoring system can include cameras that can obtain visual images of scenes at the property. A camera can be incorporated into a component of the property monitoring system, such as a doorbell.

A camera of a monitoring system can detect objects and track object movement within a field of view. For example, a doorbell camera with a field of view that includes a front yard of a property can track movement of objects, e.g., humans or pets, in the front yard. In some examples, movement detected by doorbell cameras can trigger a property monitoring system to perform one or more actions. For example, movements of humans that meet pre-programmed criteria may trigger the property monitoring system to send a notification to a resident of the property or to adjust a setting of the property monitoring system. Example criteria can include a human approaching the property within a certain range or at a certain speed, a threshold number of humans approaching the property, a human approaching the property late at night, or a combination of these.

A camera of a monitoring system can capture images of a scene and identify objects, or targets, to be tracked within the field of view. In some examples, a target can be a human, an animal, or a vehicle. A camera can use video tracking to associate targets in consecutive video images, or frames. For example, a doorbell camera can use video tracking to identify a location of one or more targets in a frame, and to predict locations of the targets in a subsequent frame. To perform object tracking, a camera can include an object detector and an object tracker. In some examples, the object detector and the object tracker can run on a computing system within the camera, can transfer video data to an external computing system, or a combination of both.

A camera may perform object tracking by identifying bounding boxes around objects within frames. The bounding boxes can include feature points within the bounding boxes. A feature point may be one or more points in an image that are mapped to a coordinate system. Values of pixels at or around the feature point can be matched to values of pixels in another image.

For example, a feature point may be mapped to a coordinate at [x, y] in an image, where x can represent a horizontal number of pixels and y can represent a vertical number of pixels. The pixels at or around the coordinate [x, y] can include, for example, a 3-by-3 square of pixels.

Values of the pixels can include red, green, and blue pixel values. An object tracker can attempt to match the red, green, and blue pixel values in the 3-by-3 square of pixels with red, green, and blue values of another 3-by-3 square of pixels in another image. In this way, the feature points can be used for matching and comparing feature points of a first frame to feature points of a second frame.

In some examples, uniform grid points inside the bounding box may be used as feature points. However, these feature points from uniform grid points may include feature points generated from static background objects included in the bounding box, which may prevent reliable tracking of the objects. Accordingly, the doorbell camera may attempt to generate feature points from only portions of the bounding box that show motion.

Additionally or alternatively, an object may be attempted to be tracked by searching for feature points in an entirety of a next frame. However, searching an entirety of a next frame may be a computationally intensive process and introduce errors. Accordingly, the doorbell camera may attempt to reduce computations and errors by predicting the next position of the bounding box in the next frame, and then search for matches only in an area of the next frame using the prediction.

In general, one innovative aspect of the subject matter described in this specification can be embodied in methods that include the actions of obtaining a first image of a scene captured by a camera; identifying a bounding object around an object detected in the first image; identifying areas of motion in the first image; selecting first feature points that are within both the bounding object and the areas of motion in the first image; obtaining a second image of the scene captured by the camera after the first image was captured; and detecting the object in the second image using the first feature points.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. Detecting the object in the second image includes: identifying, in the second image, second feature points that satisfy a similarity threshold for the first feature points in the first image; and detecting the object in the second image using the identified second feature points. The actions include determining whether a motion prediction of the object is available that indicates an area of the second image where the object is likely located; and in response to determining that the motion prediction of the object is available, searching, in the area of the second image where the object is likely located, for the second feature points that satisfy the similarity threshold for the first feature points in the first image. Identifying the areas of motion in the first image includes: obtaining a previous image of the scene captured by the camera before the first image was captured; determining differences between the first image and the previous image; and identifying the areas of motion in the first image using the differences.

In general, another innovative aspect of the subject matter described in this specification can be embodied in methods that include the actions of obtaining first feature points of an object in a first image of a scene captured by a camera; obtaining a second image of the scene captured by the camera after the first image was captured; determining whether a motion prediction of the object is available that indicates an area of the second image where the object is likely located; in response to determining that the motion prediction of the object is available, identifying, in the area of the second image where the object is likely located, second feature points that satisfy a similarity threshold for the first feature points in the first image; and detecting the object in the second image using the identified second feature points.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. Obtaining the first feature points of the object in the first image includes: obtaining the first image of the scene captured by the camera; identifying a bounding object around the object in the first image; identifying areas of motion in the first image; and selecting the first feature points that are within both the bounding object and the areas of motion in the first image. The actions include generating the motion prediction of the object using a Kalman filter algorithm. The actions include generating the motion prediction of the object using the first image and one or more images captured by the camera before the first image was captured.

The subject matter described in this specification can be implemented in various implementations and may result in one or more of the following advantages. In some implementations, instead of using uniform grid feature points inside an object bounding box, the systems and methods described in this specification can select feature points inside a motion mask and can use the feature points inside the motion mask for more accurate tracking of an object. In some implementations, instead of searching for feature points in an entirety of a next frame, the systems and methods described in this specification can predict the next position of an object in the next frame, and then can search for matching feature points only in an area of the next position of the object in the next frame, reducing the computation resources necessary, improving the accuracy of the searching process, or both.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow chart illustrating an example of a process for object tracking using a motion mask.

FIG. 3 is a flow chart illustrating an example of a process for object tracking using motion prediction.

Like reference numbers and designations in the various drawings indicate like elements.

DETAILED DESCRIPTION

Figure 1:
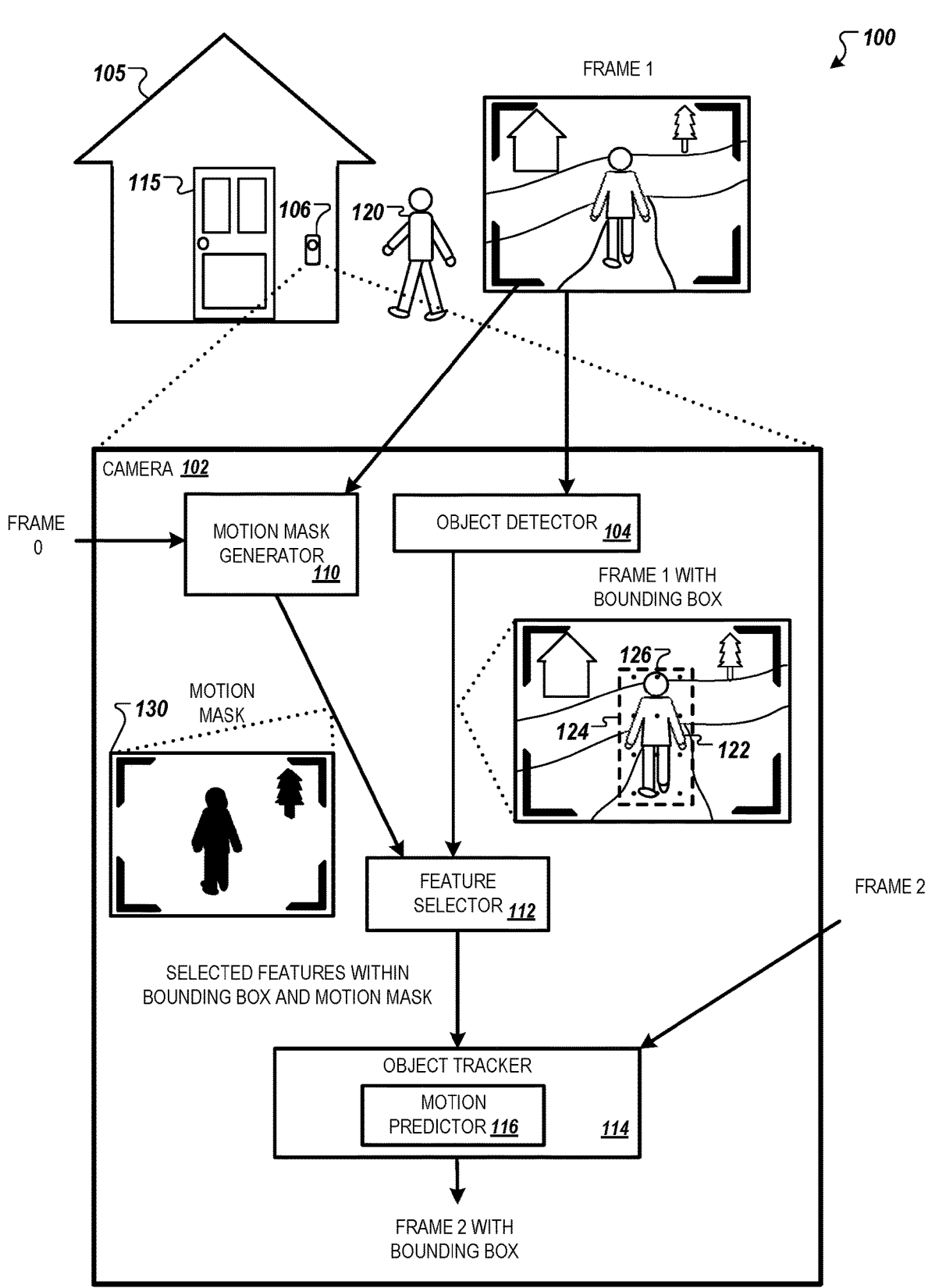
FIG. 1 illustrates an example environment for object tracking using motion mask, motion prediction, or both.

FIG. 1 illustrates an example environment 100 for object tracking using motion mask, motion prediction, or both. In FIG. 1, a camera 102 is installed at a property 105. The property 105 can be a home, another residence, a place of business, a public space, or another facility that has one or more cameras 102 installed. The camera 102 may be a doorbell camera that is a component of a doorbell 106 that is installed external to the property 105. The doorbell 106 may be installed near a front door 115 of the property 105. In some examples, the doorbell 106 can be a component of a property monitoring system that collects data from various sensors to monitor conditions and events at the property 105.

In addition to the camera 102, the doorbell 106 may include other components and sensors. For example, the doorbell 106 may include a button that, when depressed, causes an audible tone to sound at the property 105. The doorbell 106 may also include additional sensors, e.g., a motion sensor, temperature sensor, light sensor, and a microphone.

The camera 102 captures video from a scene within a field of view. The video includes multiple sequential images, also referred to as frames. The video can include any type of images. For example, the video can include visual light images, infrared images, or radio wave images. In some examples, the video can include a combination of one or more types of images, e.g., visual light images with infrared illumination.

The field of view is an area that is observable by the camera 102. The camera 102 has a field of view that includes the area in front of the property 105. For example, the field of view can include a front yard, walkway, and street in front of the property 105.

In some examples, the camera 102 can capture video continuously. In some examples, the camera 102 can capture video when triggered by an event. For example, the camera 102 may capture video when triggered by depression of the button on the doorbell 106. In some examples, the camera 102 may capture video when triggered by activation of the motion sensor or other sensor of the doorbell 106.

The camera 102 may capture video for a preprogrammed amount of time. For example, when triggered by depression of the button on the doorbell 106, the camera 102 may capture video for a preprogrammed time of 10 seconds, 30 seconds, or 60 seconds. When triggered by a motion sensor, the camera 102 may capture video for a preprogrammed time, may capture video until the motion sensor no longer detects motion, or a combination of both.

The camera 102 can perform video analysis on captured video. Video analysis can include detecting, identifying, and tracking objects, or targets, in the video. The camera 102 includes an object detector 104 that can detect the presence of a target object within a frame. When the object detector 104 detects a target object, the object detector 104 can identify a bounding box around the image of the target object in the frame. The camera 102 includes an object tracker 114 that can track object movement from one frame to a next frame. The object tracker 114 can track the bounding boxes of existing target objects in each subsequent frame.

Operations of the object detector 104 may require more computation time than operations of the object tracker 114. Therefore, the camera 102 may run the object detector 104 less frequently than the object tracker 114. For example, the camera 102 may run the object detector 104 by providing captured frames to the object detector 104 every third frame, every fifth frame, every tenth frame, or at some other frequency. The camera 102 may run the object tracker 114 more frequently than the object detector 104. For example, the camera 102 may provide captured frames to the object tracker 114 on every frame that the object detector 104 is not run on, or on every other frame that the object detector 104 is not run on.

In the example of FIG. 1, a visitor 120 approaches the front door 115 of the property 105. The camera 102 captures a video that includes Frame 1. The camera 102 may capture the video including Frame 1, for example, upon one or more of being triggered by a motion sensor that detects the motion of the visitor 120, as part of a constant capturing of frames, or upon a doorbell button being pressed. Frame 1 includes an image of the visitor 120. Frame 1 also includes images of background objects, including a vehicle, a house, a tree, a street, and a walkway.

The object detector 104 receives Frame 1, including the image of the visitor 120. The object detector 104 identifies the image of the visitor as a human target 122. The object detector 104 identifies a bounding box 124 around the human target 122. The bounding box 124 can be an area of the frame where the human target 122 is positioned. The bounding box 124 can coarsely outline the human target 122 using, for example, a rectangular shape with a height and a width.

The bounding box 124 includes the human target 122 within the perimeter of the bounding box 124. The bounding box 124 also includes images of background objects within the perimeter of the bounding box 124. For example, the bounding box 124 includes portions of images of the walkway and the street. The bounding box 124 excludes images of other background objects, including images of the vehicle, the house, and the tree.

The bounding box 124 includes feature point 126. A feature point 126 may be one or more points in an image that are mapped to a coordinate system. Values of pixels at or around the feature point 126 can be matched to values of pixels in another image. The pixels at or around the feature point 126 can include, for example, a 3-by-3 square of pixels. Values of the pixels can include red, green, and blue pixel values.

An object tracker can attempt to match the red, green, and blue pixel values in the 3-by-3 square of pixels with red, green, and blue values of another 3-by-3 square of pixels in another image. Thus, the feature point 126 can be used for tracking feature points of objects between frames. In some implementations, the frame may include feature points that aren't within the bounding box 124, but only feature points from within the bounding box may be used for matching to a subsequent frame.

In some examples, the feature points can be arranged in a uniform grid pattern within a bounding box. However, the selection of feature points that correspond to pixels that aren't part of the object to be tracked may cause tracking to fail. For example, if half the feature points show ground or sidewalk in the bounding box and the other half the feature points show part of the human target 122, when the human target 122 moves, half of the feature points will move with the human target 122 and the other half the feature points that show ground or sidewalk will not move, and the object tracker may then be unable to generate a bounding box where the feature points all have the same relative positions from each other from a prior frame.

The object detector 104 outputs frames with bounding boxes to the feature selector 112. For example, the object detector 104 outputs Frame 1 with the bounding box 124 to the feature selector 112.

The motion mask generator 110 obtains frames from the camera 102 and generates a motion mask from the frames. For example, the motion mask generator 110 may receive Frame 1 and Frame 0, that was the frame captured by the camera 102 immediately before Frame 1 was captured, and generate the motion mask 130.

The motion mask may include the same dimensions as the frames, and may have pixels that each includes a binary value that indicates whether motion was detected in the pixel. For example, the motion mask 130 may show a value of zero for a pixel in the upper left most corner to indicate there was no motion detected in that location in Frame 0 and Frame 1. In some examples, the motion mask 130 may show a value of one for a pixel in the center of the motion mask 130 as the human target 122 in the center of the image moved. As shown in FIG. 1, the motion mask 130 may show that the only motion between Frame 0 to Frame 1 was the human target 122 slightly moving and a tree in the upper right slightly moving.

The motion mask generator 110 may generate the motion mask by determining differences between two frames. For example, the motion mask generator 110 may generate the motion mask 130 by determining differences between Frame 0 and Frame 1. The motion mask generator 110 may generate the motion mask, including: converting frames in the red, green, blue (RGB) color space to the LUV color space, determining the differences between the luminance value for each pixel location between the two frames, and determining whether the difference satisfies a luminance criteria.

For example, the motion mask generator 110 may determine a luminance value of seventy for the center pixel in Frame 0, determine a luminance value of one hundred for the center pixel in Frame 1, determine the difference of thirty satisfies a threshold difference of ten, and set the value for the center pixel in the motion mask as one. In some examples, the motion mask generator 110 may determine a luminance value of three for the upper left most pixel in Frame 0, determine a luminance value of nine for the upper left most pixel in Frame 1, determine the difference of six does not satisfy a threshold difference of ten, and set the value for the center pixel in the motion mask as zero.

The motion mask generator 110 may provide the motion mask to the feature selector 112. For example, the motion mask generator 110 may provide the motion mask 130 to the feature selector 112.

The feature selector 112 may select feature points to use for tracking the object using the bounding box and the motion mask. For example, the feature selector 112 may select all the feature points in the bounding box 124 as represented by dots in FIG. 1, except for the upper left most, upper right most, and bottom right most. The feature selector 112 may select feature points that correspond to moving objects to avoid selecting feature points that correspond to non-moving background objects.

The feature selector 112 may select feature points by only selecting feature points from among the feature points that are both in the bounding box and at a location that the motion mask indicates motion. For example, the feature selector 112 may select the feature point in the center of the bounding box 124 because the feature point is both within the bounding box 124 and in a location that the motion mask indicates motion.

In some examples, the feature selector 112 may not select the feature point in the upper left most corner of the bounding box 124 because, while the feature point is within the bounding box 124, the feature point is not in a location that the motion mask indicates motion. In some examples, the feature selector 112 may not select the feature point where the tree is shown because, while the motion mask indicates that location includes motion, the feature point is not within the bounding box 124.

In some implementations, the feature selector 112 may determine, using an amount of motion shown in the bounding box, whether to select feature points using the motion mask. For example, the feature selector 112 may determine, based on 80% of the bounding box showing motion, to select feature points from only locations in the bounding box that show motion. In some examples, the feature selector 112 may determine, based on 20% of the bounding box showing motion, to select feature points from locations in the bounding box that may or may not show motion.

The feature selector 112 may determine, from determining whether a motion criteria is satisfied, whether to select feature points using the motion mask. For example, the feature selector 112 may determine that the motion mask indicates that more than 50% of the bounding box shows motion and, in response, determine to select only feature points within the bounding box that indicate motion.

In some examples, the feature selector 112 may determine that the motion mask indicates that less than 50% of the bounding box shows motion and, in response, determine to select feature points within the bounding box without further analysis of whether the motion mask indicates motion in various locations. The feature selector 112 may determine whether a motion criteria is satisfied to determine whether motion indicated by the motion mask is noise or is from actual motion of an object to be tracked. Noise may correspond to less motion in the bounding box and actual motion may correspond to more motion in the bounding box.

The camera 102 continues to capture subsequent frames, including Frame 2. Frame 2 includes an image of the visitor 120. As the visitor 120 continues to approach the front door 115, the appearance of the visitor 120 is expected to change between Frame 2 and Frame 1. For example, the visitor 120 is likely to get larger and show up in different pixel locations.

As described above, due to increased computation time, the camera 102 might not run the object detector 104 on Frame 2. The object tracker 114 tracks movement of the human target 122 between Frame 1 and Frame 2. The object tracker 114 can track movement of the human target 122, for example, by searching Frame 2 for feature points that match the previously selected feature points.

The object tracker 114 receives the selected feature points and subsequent frame, and attempts to match each selected feature point to a feature point in the subsequent frame. For example, the object tracker 114 may attempt to match all the selected feature points from Frame 1 to feature points in Frame 2, where the relative positions of the selected feature points in Frame 1 are expected to be similar in the matching feature points in Frame 2.

The object tracker 114 locates the human target 122 in the Frame 2 using the identified feature points in Frame 2 and generates a bounding box around the human target 122. The object tracker 114 outputs Frame 2 with the bounding box. The object tracker 114 can continue to track the human target 122 until the camera 102 runs the object detector 104 on a following frame, until the human target 122 no longer appears in the field of view, or a combination of both.

In some implementations, the object tracker 114 may include a motion predictor 116 that the object tracker 114 may use to attempt to more accurately track an object. Without the motion predictor 116, the object tracker 114 may search for feature points that match selected feature points in an extended neighborhood centered where the object was previously detected. For example, the object tracker 114 may search only an area that is within five pixels of the previous bounding box. However, if there is another object that has the similar color appearance in the subsequent frame, the object tracker 114 may have difficulty determining which object needs to be matched.

The motion predictor 116 may limit the search area for the object tracker 114. The motion predictor 116 may determine whether a motion prediction is available and, if available, the object tracker 114 may search for feature points only in a region of the frame where the motion prediction indicates the object will be, and, if not available, the object tracker 114 may search for feature points in the entire frame.

The motion predictor 116 may use a Kalman filter algorithm to generate motion prediction. For example, the motion predictor 116 may exploit a series of observation measurements (e.g. bounding box information such as center point (x, y) and width and height of the bounding box) over the length of object trajectory, containing statistical noise. The motion predictor 116 may estimate unknown variables (x, y, width, height) with statistical distribution by estimating a joint probability distribution over the variables for each timeframe. Given the observed target trajectory, the motion predictor 116 may compute the predicted trajectory in the next frame. The predicted trajectory may indicate the candidate regions of the bounding box in the next frame. The object tracker 114 may then search the candidate regions for the selected feature points. The candidate regions may be much smaller than the entire frame and can reduce the computation cost for the task of feature matching.

The motion predictor 116 may provide a prediction with sufficient history of locations of the target. For example, the motion predictor 116 may be able to provide a prediction if the tracked object was detected within at least the thirty most recent frames. The search area may include the bounding box around where the tracked object is predicted to be. For example, the search area may include an area centered at the center of the bounding box around where the tracked object is predicted to be, enlarged by 20%, 30%, or some other amount.

The camera 102 or the property monitoring system is an example of a system implemented as computer programs on one or more computers in one or more locations, in which the systems, components, and techniques described in this specification are implemented. The property monitoring system may include personal computers, mobile communication devices, and other devices that can send and receive data over a network. The network (not shown), such as a local area network ("LAN"), wide area network ("WAN"), the Internet, or a combination thereof, connects the devices of the property monitoring system, such as the camera 102. The property monitoring system may use a single server computer or multiple server computers operating in conjunction with one another, including, for example, a set of remote computers deployed as a cloud computing service.

The property monitoring system, e.g., the camera 102, can include several different functional components, including an object detector 104, a motion mask generator 110, a feature selector 112, an object tracker 114, and a motion predictor 116. The object detector 104, the motion mask generator 110, the feature selector 112, the object tracker 114, or the motion predictor 116, or a combination of these, can include one or more data processing apparatuses, can be implemented in code, or a combination of both. For instance, each of the object detector 104, the motion mask generator 110, the feature selector 112, the object tracker 114, and the motion predictor 116 can include one or more data processors and instructions that cause the one or more data processors to perform the operations discussed herein.

The various functional components of the property monitoring system, e.g., the camera 102, may be installed on one or more computers as separate functional components or as different modules of a same functional component. For example, the components of the object detector 104, the motion mask generator 110, the feature selector 112, the object tracker 114, and the motion predictor 116 of the property monitoring system, e.g., the camera 102, can be implemented as computer programs installed on one or more computers in one or more locations that are coupled to each through a network. In cloud-based systems for example, these components can be implemented by individual computing nodes of a distributed computing system.

FIG. 2 is a flow chart illustrating an example of a process 200 for object tracking using a motion mask. The process 200 can be performed by a camera, e.g. the camera 102. In some implementations, the process 200 can be performed by one or more computer systems that communicate electronically with a camera, e.g., over a network. In some implementations, the process 200 can be performed by a property monitoring system.

The process 200 includes obtaining a first image of a scene captured by a camera (202). For example, the camera 102 may generate Frame 1.

The process 200 includes identifying a bounding object around an object detected in the first image (204). A bounding object can define an area around an object detected in the first image. In some implementations, the bounding object can be a bounding box around the object detected in the first image. In some implementations, the bounding object can be a circle, a square, a triangle, or another shape. For example, the object detector 104 may generate the bounding box 124 around the human target 122 shown in Frame 1.

The process 200 includes identifying areas of motion in the first image (206). In some implementations, identifying the areas of motion in the first image can include: obtaining a previous image of the scene captured by the camera before the first image was captured; determining differences between the first image and the previous image; and identifying the areas of motion in the first image using the differences. For example, the motion mask generator 110 may generate the motion mask 130 from Frame 1 and previously captured Frame 0.

The process 200 includes selecting first feature points within the bounding object and the areas of motion in the first image (208). For example, the feature selector 112 may select the feature point 126 that is within the bounding box 124 and indicated by the motion mask 130 as showing motion.

The process 200 includes obtaining a second image of the scene captured by the camera after the first image was captured (210). For example, the object tracker 114 may receive Frame 2 that was captured by the camera 102 after Frame 1 was captured.

The process 200 includes detecting the object in the second image using the selected feature points (212). For example, the object tracker 114 may detect the human target 122 in Frame 2 by matching the selected feature points from Frame 1 to feature points in Frame 2.

In some implementations, the system can use the selected feature points in other video analytics. For example, the system can use the selected feature points on the same object over time to learn a visual representation of the object according to the locations and descriptions of the feature points. The system can use the visual representation for downstream video analytics tasks, such as long-term person re-identification and forensic search.

In some implementations, detecting the object in the second image can include: identifying, in the second image, second feature points that satisfy a similarity threshold for the first feature points in the first image; and detecting the object in the second image using the identified second feature points. In some implementations, the second feature points in the second image that satisfy the similarity threshold for the first feature points can be the second feature points that "matches" the first feature points.

For example, the system can compute a score characterizing the differences between the pixel values of second feature points and the pixel values of the first feature points. The system can determine whether the score satisfies the similarity threshold, e.g., larger than a threshold value. If the score satisfies the similarity threshold, the system can identify the second feature points as feature points in the second image that "matches" the first feature points in the first image. If the score does not satisfy the similarity threshold, the system can search for other feature points in the second image that "matches" the first feature points.

In some implementations, the process 200 can include determining whether a motion prediction of the object is available that indicates an area of the second image where the object is likely located; and in response to determining that the motion prediction of the object is available, searching, in the area of the second image where the object is likely located, for the second feature points that satisfy the similarity threshold for the first feature points in the first image.

The order of steps in the process 200 described above is illustrative only, and the steps in the process 200 can be performed in different orders. For example, the step 210 can be performed before one or more of the steps 204, 206, and 208. In some implementations, the process 200 can include additional steps, fewer steps, or some of the steps can be divided into multiple steps.

FIG. 3 is a flow chart illustrating an example of a process 300 for object tracking using motion prediction. The process 300 can be performed by a camera, e.g., the camera 102. In some implementations, the process 300 can be performed by one or more computer systems that communicate electronically with a camera, e.g., over a network. In some implementations, the process 200 can be performed by a property monitoring system.

The process 300 includes obtaining first feature points of an object in a first image of a scene captured by a camera (302). For example, the object tracker 114 may obtain feature points including a feature point 126 selected by the feature selector 112.

In some implementations, obtaining the first feature points of the object in the first image can include: obtaining the first image of the scene captured by the camera; identifying a bounding object around the object in the first image; identifying areas of motion in the first image; and selecting the first feature points that are within both the bounding object and the areas of motion in the first image.

The process 300 includes obtaining a second image of the scene captured by the camera after the first image was captured (303). For example, the camera 102 can capture Frame 2 that includes an image of the visitor 120.

The process 300 includes determining whether a motion prediction of the object is available that indicates an area of the second image where the object is likely located (304). In some implementations, the process 300 can include generating the motion prediction of the object using the first image and one or more images captured by the camera before the first image was captured. For example, the motion predictor 116 may determine whether the tracked object was detected in the thirty most recent frames and, if so, determine the motion prediction is available and, if not, determine the motion prediction is not available.

In some implementations, the process 300 can include generating the motion prediction of the object using a Kalman filter algorithm. For example, in Kalman filtering, the system can take an object motion model (e.g., a motion mask) and an observation model as input, and can predict the object location in the next frame using the object's location in the current frame.

The process 300 includes, in response to determining that the motion prediction of the object is available, identifying, in the area of the second image where the object is likely located, second feature points that satisfy a similarity threshold for the first feature points in the first image (308). In some implementations, if the motion prediction is available, the process 300 can include identifying, from a predicted area of the second image, second feature points that match the first feature points in the first image. For example, the object tracker 114 may match feature points from Frame 1 to feature points in Frame 2 that are in the predicted area (e.g., the area that the motion prediction indicates the tracked object will be) in Frame 2, and not other areas of Frame 2.

In some implementations, the process 300 can include, in response to determining that the motion prediction of the object is not available, identifying, in the second image, second feature points that satisfy a similarity threshold for the first feature points in the first image (306). For example, sometimes, there can be too many objects in the image and it may not be feasible to perform motion prediction, such as using the Kalman filters to predict the motion of each object. In some implementations, if the motion prediction is not available, the process 300 can include identifying, from an entirety of the second image, second feature points that match the first feature points in the first image. For example, the object tracker 114 may match feature points from Frame 1 to feature points in an entirety of Frame 2.

The process 300 includes detecting the object in the second image using the identified second feature points (310). For example, the object tracker 114 may detect the object in the second image in response to determining that there are matches between the obtained feature points from the first image and the feature points in the second image.

The order of steps in the process 300 described above is illustrative only, and the steps in the process 300 can be performed in different orders. In some implementations, the process 300 can include additional steps, fewer steps, or some of the steps can be divided into multiple steps.

Figure 4:
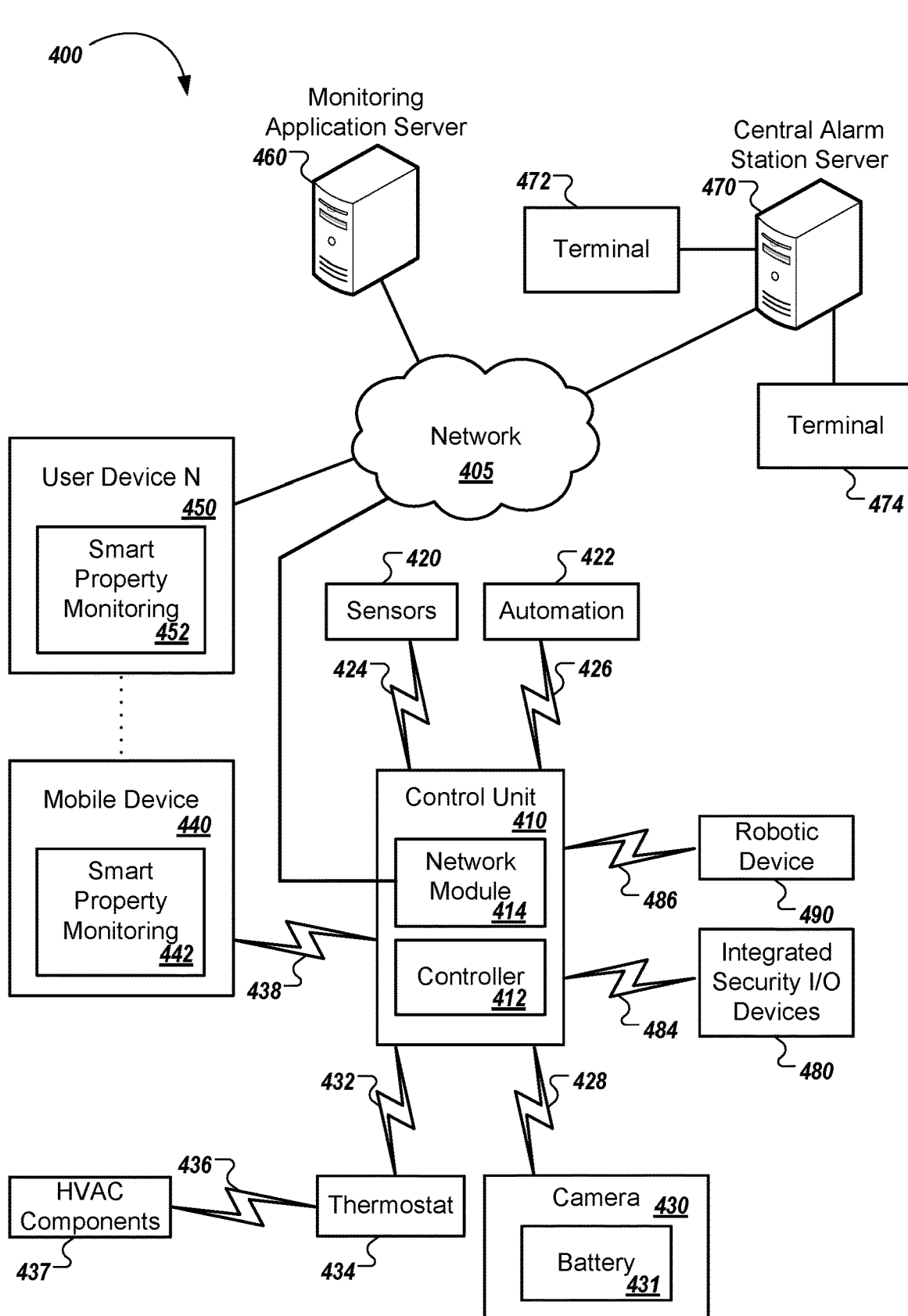
FIG. 4 is a diagram illustrating an example of a property monitoring system.

FIG. 4 is a diagram illustrating an example of a property monitoring system 400. The property monitoring system 400 includes a network 405, a control unit 410, one or more user devices 440 and 450, a monitoring application server 460, and a central alarm station server 470. In some examples, the network 405 facilitates communications between the control unit 410, the one or more user devices 440 and 450, the monitoring application server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring application server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, a cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system 400 may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the property. The health monitoring sensor can collect various health data, including pulse, heart-rate, respiration rate, sugar or glucose level, bodily temperature, or motion data. The sensors 420 can include a radio-frequency identification (RFID) sensor that identifies a particular article that includes a pre-assigned RFID tag.

The control unit 410 communicates with the module 422 and a camera 430 to perform monitoring. The module 422 is connected to one or more devices that enable property automation, e.g., home or business automation. For instance, the module 422 may be connected to one or more lighting systems and may be configured to control operation of the one or more lighting systems. Also, the module 422 may be connected to one or more electronic locks at the property and may be configured to control operation of the one or more electronic locks (e.g., control Z-Wave locks using wireless communications in the Z-Wave protocol). Further, the module 422 may be connected to one or more appliances at the property and may be configured to control operation of the one or more appliances. The module 422 may include multiple modules that are each specific to the type of device being controlled in an automated manner. The module 422 may control the one or more devices based on commands received from the control unit 410. For instance, the module 422 may cause a lighting system to illuminate an area to provide a better image of the area when captured by a camera 430. The camera 430 can include one or more batteries 431 that require charging.

A drone 490 can be used to survey the electronic system 400. In particular, the drone 490 can capture images of each item found in the electronic system 400 and provide images to the control unit 410 for further processing. Alternatively, the drone 490 can process the images to determine an identification of the items found in the electronic system 400.

The camera 430 may be a video/photographic camera or other type of optical sensing device configured to capture images. For instance, the camera 430 may be configured to capture images of an area within a property monitored by the control unit 410. The camera 430 may be configured to capture single, static images of the area or video images of the area in which multiple images of the area are captured at a relatively high frequency (e.g., thirty images per second) or both. The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the module 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries, e.g., if located remotely from the control unit 410. The camera 430 may employ a small solar cell to recharge the battery when light is available. The camera 430 may be powered by the controller's 412 power supply if the camera 430 is co-located with the controller 412.

In some implementations, the camera 430 communicates directly with the monitoring application server 460 over the Internet. In these implementations, image data captured by the camera 430 does not pass through the control unit 410 and the camera 430 receives commands related to operation from the monitoring application server 460.

The system 400 also includes thermostat 434 to perform dynamic environmental control at the property. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a property and/or environmental data at a property, e.g., at various locations indoors and outdoors at the property. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more module 422.

A module 437 is connected to one or more components of an HVAC system associated with a property, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in security monitoring. For example, the robotic devices 490 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices 490 may be robotic devices 490 that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a property. In these examples, the robotic devices 490 include sensors and control processors that guide movement of the robotic devices 490 within the property. For instance, the robotic devices 490 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the property and guide movement of the robotic devices 490 in a manner that avoids the walls and other obstacles.

In addition, the robotic devices 490 may store data that describes attributes of the property. For instance, the robotic devices 490 may store a floorplan and/or a three-dimensional model of the property that enables the robotic devices 490 to navigate the property. During initial configuration, the robotic devices 490 may receive the data describing attributes of the property, determine a frame of reference to the data (e.g., a property or reference location in the property), and navigate the property based on the frame of reference and the data describing attributes of the property. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a property charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensor that may be useful in capturing monitoring data related to the property and users in the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the property. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the property. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the property. The robotic devices 490 may be configured to navigate to the charging stations after completion of tasks needed to be performed for the property monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the property monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the property may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the property that is not associated with a charger. The number of community charging stations may be less than the number of robotic devices 490.

Also, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive sensor data from the sensors 420 and determine whether to provide an alert to the one or more integrated security input/output devices 480.

The sensors 420, the module 422, the camera 430, the thermostat 434, and the integrated security devices 480 may communicate with the controller 412 over communication links 424, 426, 428, 432, 438, 484, and 486. The communication links 424, 426, 428, 432, 438, 484, and 486 may be a wired or wireless data pathway configured to transmit signals from the sensors 420, the module 422, the camera 430, the thermostat 434, the drone 490, and the integrated security devices 480 to the controller 412. The sensors 420, the module 422, the camera 430, the thermostat 434, the drone 490, and the integrated security devices 480 may continuously transmit sensed values to the controller 412, periodically transmit sensed values to the controller 412, or transmit sensed values to the controller 412 in response to a change in a sensed value. In some implementations, the drone 490 can communicate with the monitoring application server 460 over network 405. The drone 490 can connect and communicate with the monitoring application server 460 using a Wi-Fi or a cellular connection.

The communication links 424, 426, 428, 432, 438, 484, and 486 may include a local network. The sensors 420, the module 422, the camera 430, the thermostat 434, the drone 490 and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "HomePlug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 460 is an electronic device configured to provide monitoring services by exchanging electronic communications with the control unit 410, the one or more user devices 440 and 450, and the central alarm station server 470 over the network 405. For example, the monitoring application server 460 may be configured to monitor events (e.g., alarm events) generated by the control unit 410. In this example, the monitoring application server 460 may exchange electronic communications with the network module 414 included in the control unit 410 to receive information regarding events (e.g., alerts) detected by the control unit 410. The monitoring application server 460 also may receive information regarding events (e.g., alerts) from the one or more user devices 440 and 450.

In some examples, the monitoring application server 460 may route alert data received from the network module 414 or the one or more user devices 440 and 450 to the central alarm station server 470. For example, the monitoring application server 460 may transmit the alert data to the central alarm station server 470 over the network 405.

The monitoring application server 460 may store sensor and image data received from the monitoring system 400 and perform analysis of sensor and image data received from the monitoring system 400. Based on the analysis, the monitoring application server 460 may communicate with and control aspects of the control unit 410 or the one or more user devices 440 and 450.

The monitoring application server 460 may provide various monitoring services to the system 400. For example, the monitoring application server 460 may analyze the sensor, image, and other data to determine an activity pattern of a resident of the property monitored by the system 400. In some implementations, the monitoring application server 460 may analyze the data for alarm conditions or may determine and perform actions at the property by issuing commands to one or more components of the system 400, possibly through the control unit 410.

The central alarm station server 470 is an electronic device configured to provide alarm monitoring service by exchanging communications with the control unit 410, the one or more mobile devices 440 and 450, and the monitoring application server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring application server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more user devices 440 and 450 are devices that host and display user interfaces. For instance, the user device 440 is a mobile device that hosts or runs one or more native applications (e.g., the smart property application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a smart property application 442. The smart property application 442 refers to a software/firmware program running on the corresponding mobile device that enables the user interface and features described throughout. The user device 440 may load or install the smart property application 442 based on data received over a network or data received from local media. The smart property application 442 runs on mobile devices platforms, such as iPhone, iPod touch, Blackberry, Google Android, Windows Mobile, etc. The smart property application 442 enables the user device 440 to receive and process image and sensor data from the monitoring system.

The user device 450 may be a general-purpose computer (e.g., a desktop personal computer, a workstation, or a laptop computer) that is configured to communicate with the monitoring application server 460 and/or the control unit 410 over the network 405. The user device 450 may be configured to display a smart property user interface 452 that is generated by the user device 450 or generated by the monitoring application server 460. For example, the user device 450 may be configured to display a user interface (e.g., a web page) provided by the monitoring application server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (Ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring application server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring application server 460 may relay data received from the control unit 410 to the one or more user devices 440 and 450 through the network 405. In this regard, the monitoring application server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring application server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring application server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the module 422, the camera 430, and the robotic devices, e.g., that can include the drone 490. The one or more user devices 440 and 450 receive data directly from the sensors 420, the module 422, the camera 430, and the robotic devices and send data directly to the sensors 420, the module 422, the camera 430, and the robotic devices. The one or more user devices 440, 450 provide the appropriate interfaces/processing to provide visual surveillance and reporting.

In other implementations, the system 400 further includes network 405 and the sensors 420, the module 422, the camera 430, the thermostat 434, and the robotic devices are configured to communicate sensor and image data to the one or more user devices 440 and 450 over network 405 (e.g., the Internet, cellular network, etc.). In yet another implementation, the sensors 420, the module 422, the camera 430, the thermostat 434, and the robotic devices are intelligent enough to change the communication pathway from a direct local pathway when the one or more user devices 440 and 450 are in close physical proximity to the sensors 420, the module 422, the camera 430, the thermostat 434, and the robotic devices to a pathway over network 405 when the one or more user devices 440 and 450 are farther from the sensors 420, the module 422, the camera 430, the thermostat 434, and the robotic devices. In some examples, the system leverages GPS information from the one or more user devices 440 and 450 to determine whether the one or more user devices 440 and 450 are close enough to the sensors

420, the module 422, the camera 430, the thermostat 434, and the robotic devices to use the direct local pathway or whether the one or more user devices 440 and 450 are far enough from the sensors 420, the module 422, the camera 430, the thermostat 434, and the robotic devices that pathway over network 405 is required. In other examples, the system leverages status communications (e.g., pinging) between the one or more user devices 440 and 450 and the sensors 420, the module 422, the camera 430, the thermostat 434, and the robotic devices to determine whether communication using the direct local pathway is possible. If communication using the direct local pathway is possible, the one or more user devices 440 and 450 communicate with the sensors 420, the module 422, the camera 430, the thermostat 434, and the robotic devices using the direct local pathway. If communication using the direct local pathway is not possible, the one or more user devices 440 and 450 communicate with the sensors 420, the module 422, the camera 430, the thermostat 434, and the robotic devices using the pathway over network 405.

In some implementations, the system 400 provides end users with access to images captured by the camera 430 to aid in decision-making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system 400 and other events sensed by the monitoring system 400 may be used to enable/disable video/image recording devices (e.g., the camera 430). In these implementations, the camera 430 may be set to capture images on a periodic basis when the alarm system is armed in an "away" state, but set not to capture images when the alarm system is armed in a "stay" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:
obtaining, by a camera, first feature points of an object in a first image of a scene captured by the camera;
obtaining, by the camera, a second image of the scene captured by the camera after the first image was captured;
determining, by the camera, whether a motion prediction of the object based on one or more images other than the second image is available and can be used to predict an area of the second image where the object is likely located;
in response to determining that the motion prediction of the object is available and can be used to predict the area of the second image where the object is likely located, predicting, by the camera and using (i) the motion prediction of the object and (ii) an area of the object in the first image, the area of the second image where the object is likely located;
identifying, by the camera and in the area of the second image where the object is likely located, second feature points that satisfy a similarity threshold for the first feature points in the first image;
detecting, by the camera, the object in the second image using the identified second feature points, the detecting comprising tracking, by the camera, the object across multiple images that include the first image and the second image based on the first feature points in the first image and the second feature points in the second image; and
performing, by the camera, one or more actions using a result of the detection of the object in the second image.

2. The method of claim 1, wherein obtaining the first feature points of the object in the first image comprises:
obtaining the first image of the scene captured by the camera;
identifying a bounding object around the object in the first image;
identifying areas of motion in the first image; and
selecting the first feature points that are within both the bounding object and the areas of motion in the first image.

3. The method of claim 1, comprising:
generating the motion prediction of the object using a Kalman filter algorithm.

4. The method of claim 1, comprising:
generating the motion prediction of the object using the first image and one or more images captured by the camera before the first image was captured.

5. The method of claim 1, wherein:
the motion prediction comprises a predicted trajectory of the object in the second image, and
identifying the second feature points that satisfy the similarity threshold for the first feature points in the first image comprises:
determining, using the predicted trajectory of the object in the second image, a candidate region of a bounding object around the object in the second image; and
identifying, in the candidate region of the bounding object, the second feature points that satisfy the similarity threshold for the first feature points in the first image.

6. The method of claim 5, wherein identifying, in the candidate region of the bounding object, the second feature points comprises:
determining, a search area: (i) centered at a center of the candidate region of the bounding object in the second image, and (ii) being larger than the candidate region by a predetermined percentage; and
identifying, in the search area, the second feature points.

7. The method of claim 1, wherein obtaining the first feature points of the object in the first image comprises:
identifying a bounding object around the object in the first image;
identifying areas of motion in the first image;
calculating an amount of motion in the bounding object using the area of motion in the first image;
determining whether the amount of motion in the bounding object satisfies a threshold; and
in response to determining that the amount of motion in the bounding object satisfies the threshold, selecting the first feature points from the areas of motion inside the bounding object in the first image.

8. A system comprising one or more computers and one or more storage devices on which are stored instructions that are operable, when executed by the one or more computers, to cause the one or more computers to perform operations comprising:
obtaining first feature points of an object in a first image of a scene captured by a camera;
obtaining a second image of the scene captured by the camera after the first image was captured;
determining, by the camera, whether a motion prediction of the object based on one or more images other than the second image is available and can be used to predict an area of the second image where the object is likely located;
in response to determining that the motion prediction of the object is available and can be used to predict the area of the second image where the object is likely located, predicting, by the camera and using (i) the motion prediction of the object and (ii) an area of the object in the first image, the area of the second image where the object is likely located;
identifying, by the camera and in the area of the second image where the object is likely located, second feature points that satisfy a similarity threshold for the first feature points in the first image;
detecting the object in the second image using the identified second feature points;

obtaining a third image of the scene captured by the camera after the first image was captured;

determining whether the motion prediction of the object can be used to predict an area of the third image where the object is likely located;

in response to determining that the motion prediction of the object cannot be used to predict the area of the third image where the object is likely located, identifying, in the third image, third feature points that satisfy the similarity threshold for the first feature points in the first image;

detecting the object in the third image using the identified third feature points; and performing, by the camera, one or more actions using a result of the detection of the object in the third image.

9. The system of claim 8, wherein obtaining the first feature points of the object in the first image comprises:

obtaining the first image of the scene captured by the camera;

identifying a bounding object around the object in the first image;

identifying areas of motion in the first image; and selecting the first feature points that are within both the bounding object and the areas of motion in the first image.

10. The system of claim 8, the operations comprise:

generating the motion prediction of the object using a Kalman filter algorithm.

11. The system of claim 8, the operations comprise:

generating the motion prediction of the object using the first image and one or more images captured by the camera before the first image was captured.

12. The system of claim 8, wherein the motion prediction comprises a predicted trajectory of the object in the second image, wherein identifying the second feature points that satisfy the similarity threshold for the first feature points in the first image comprises:

determining, using the predicted trajectory of the object in the second image, a candidate region of a bounding object around the object in the second image; and identifying, in the candidate region of the bounding object, the second feature points that satisfy the similarity threshold for the first feature points in the first image.

13. The system of claim 8, wherein obtaining the first feature points of the object in the first image comprises:

identifying a bounding object around the object in the first image;

identifying areas of motion in the first image;

calculating an amount of motion in the bounding object using the area of motion in the first image;

determining whether the amount of motion in the bounding object satisfies a threshold; and in response to determining that the amount of motion in the bounding object satisfies the threshold, selecting the first feature points from the areas of motion inside the bounding object in the first image.

14. A non-transitory computer storage medium encoded with instructions that, when executed by one or more computers, cause the one or more computers to perform operations comprising:

obtaining, by a camera, first feature points of an object in a first image of a scene captured by the camera;

obtaining, by the camera, a second image of the scene captured by the camera after the first image was captured;

determining, by the camera, whether a motion prediction of the object based on one or more images other than the second image is available and can be used to predict an area of the second image where the object is likely located;

in response to determining that the motion prediction of the object is available and can be used to predict the area of the second image where the object is likely located, predicting, by the camera and using (i) the motion prediction of the object and (ii) an area of the object in the first image, the area of the second image where the object is likely located;

identifying, by the camera and in the area of the second image where the object is likely located, second feature points that satisfy a similarity threshold for the first feature points in the first image;

detecting, by the camera, the object in the second image using the identified second feature points, the detecting comprising tracking, by the camera, the object across multiple images that include the first image and the second image based on the first feature points in the first image and the second feature points in the second image; and performing, by the camera, one or more actions using a result of the detection of the object in the second image.

15. The non-transitory computer storage medium of claim 14, wherein obtaining the first feature points of the object in the first image comprises:

obtaining the first image of the scene captured by the camera;

identifying a bounding object around the object in the first image;

identifying areas of motion in the first image; and selecting the first feature points that are within both the bounding object and the areas of motion in the first image.

16. The non-transitory computer storage medium of claim 14, the operations comprise:

generating the motion prediction of the object using a Kalman filter algorithm.

17. The non-transitory computer storage medium of claim 14, the operations comprise:

generating the motion prediction of the object using the first image and one or more images captured by the camera before the first image was captured.

18. The non-transitory computer storage medium of claim 14, the operations comprise:

obtaining a third image of the scene captured by the camera after the first image was captured;

determining whether the motion prediction of the object is available that indicates an area of the third image where the object is likely located;

in response to determining that the motion prediction of the object is not available, identifying, in the third image, third feature points that satisfy the similarity threshold for the first feature points in the first image; and detecting the object in the third image using the identified third feature points.

19. The non-transitory computer storage medium of claim 14, wherein the motion prediction comprises a predicted trajectory of the object in the second image, wherein identifying the second feature points that satisfy the similarity threshold for the first feature points in the first image comprises:

determining, using the predicted trajectory of the object in the second image, a candidate region of a bounding object around the object in the second image; and identifying, in the candidate region of the bounding object, the second feature points that satisfy the similarity threshold for the first feature points in the first image.

20. The non-transitory computer storage medium of claim 14, wherein obtaining the first feature points of the object in the first image comprises:

identifying a bounding object around the object in the first image;

identifying areas of motion in the first image;

calculating an amount of motion in the bounding object using the area of motion in the first image;

determining whether the amount of motion in the bounding object satisfies a threshold; and in response to determining that the amount of motion in the bounding object satisfies the threshold, selecting the first feature points from the areas of motion inside the bounding object in the first image.

* * * * *